United States Patent [19]
Kalm et al.

[11] Patent Number: 5,901,830
[45] Date of Patent: *May 11, 1999

[54] BI-DIRECTIONAL BELT SORTER

[75] Inventors: W. Scott Kalm, Carrollton; Edward J. Budill, Houston, both of Tex.

[73] Assignee: ElectroCom Automation, L.P., Arlington, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/786,906

[22] Filed: Jan. 22, 1997

[51] Int. Cl.$^6$ ..................................................... B65G 37/00
[52] U.S. Cl. ..................................... 198/370.06; 198/377
[58] Field of Search .......................... 198/370.03, 370.06, 198/377, 475.1, 800; 414/269–271

[56] References Cited

U.S. PATENT DOCUMENTS

| | | |
|---|---|---|
| 2,369,840 | 2/1945 | Nalbach et al. . |
| 2,764,275 | 9/1956 | Lens . |
| 2,886,166 | 5/1959 | Lens . |
| 2,983,392 | 5/1961 | Ebbert ..................................... 414/276 |
| 3,018,872 | 1/1962 | Wittenberger . |
| 3,080,040 | 3/1963 | Estabrooks et al. . |
| 3,147,845 | 9/1964 | Harrison et al. . |
| 3,167,192 | 1/1965 | Harrison et al. . |
| 3,231,066 | 1/1966 | Harrison et al. . |
| 3,231,068 | 1/1966 | Harrison et al. ................... 198/370.06 |
| 3,233,720 | 2/1966 | Atanasoff et al. . |
| 3,303,916 | 2/1967 | Burt . |
| 3,395,785 | 8/1968 | Rysti . |
| 3,463,298 | 8/1969 | Harrison . |
| 3,510,014 | 5/1970 | Speaker et al. . |
| 3,669,245 | 6/1972 | Wooten et al. . |
| 3,807,553 | 4/1974 | Billett et al. . |
| 3,884,370 | 5/1975 | Bradshaw et al. . |
| 3,897,875 | 8/1975 | Luckett ................................... 209/124 |
| 3,912,071 | 10/1975 | Nielsen ............................. 198/370.06 |
| 3,915,531 | 10/1975 | Morgan ................................... 312/268 |
| 3,960,264 | 6/1976 | Carbine et al. . |
| 4,004,681 | 1/1977 | Clewett et al. .................... 198/370.03 |
| 4,067,437 | 1/1978 | Frantl et al. ............................. 198/800 |
| 4,161,095 | 7/1979 | Buday ......................................... 53/527 |
| 4,273,491 | 6/1981 | Roux ........................................ 414/109 |
| 4,503,977 | 3/1985 | Kohno et al. ........................... 209/564 |
| 4,520,447 | 5/1985 | Nara ......................................... 364/478 |
| 4,763,771 | 8/1988 | Geerts ................................. 198/370.06 |
| 4,793,462 | 12/1988 | McFall ................................. 198/370.03 |
| 4,815,582 | 3/1989 | Canziani ............................ 198/370.06 |
| 4,884,676 | 12/1989 | Suizu ................................... 198/370.06 |
| 4,892,179 | 1/1990 | Lassiter, Jr. et al. .................. 198/365 |
| 4,930,613 | 6/1990 | Okura et al. ........................ 198/370.06 |

(List continued on next page.)

FOREIGN PATENT DOCUMENTS

| | | | |
|---|---|---|---|
| 202249 | 11/1983 | Japan ..................................... 271/213 |

OTHER PUBLICATIONS

Vaitys, R. P., "Advanced Transport/Stacker Development", as published for U.S. Postal Service Advanced Technology Conference, Oct. 21–23, 1986, pp. 609–619.

Buday, John M., "Advanced Transport/Stacker–Live Mail Test", as published for U.S. Postal Service Advanced Technology Conference, May 3–5, 1988, pp. 494–505.

Buday, John M., "Advanced Transport Stacker–Live Mail Test", as published in International Journal of Research & Engineering, Inaugural issue, 1989, pp. 93–97.

Klima, Richard, "Flat Mail Test Bed", as published for U.S. Postal Service Advanced Technology Conference, Nov. 5–7, 1990, pp. 675–689.

*Primary Examiner*—David A. Bucci
*Attorney, Agent, or Firm*—Gardere & Wynne, L.L.P.

[57] ABSTRACT

A bi-directional belt sorter for unloading items into a selected bin located along a travel path of a conveyor system includes a carrier and a support frame secured to the carrier. The carrier has a plurality of orientations with respect to the support frame. The carrier includes a conveyor belt for unloading items into the selected bin located to the side of or in-line with the travel path of the conveyor system. The conveyor system includes a host computer for controlling the distribution of items to selected bins.

23 Claims, 3 Drawing Sheets

U.S. PATENT DOCUMENTS

| | | | |
|---|---|---|---|
| 4,961,488 | 10/1990 | Steeghs | 198/357 |
| 4,993,535 | 2/1991 | Scata | 198/365 |
| 5,086,929 | 2/1992 | Richter et al. | 209/698 |
| 5,090,552 | 2/1992 | Fukuyama et al. | 198/365 |
| 5,101,956 | 4/1992 | Gambetti | 198/475.1 X |
| 5,293,983 | 3/1994 | Grapes et al. | 209/900 X |
| 5,322,406 | 6/1994 | Pippin et al. | 414/273 |
| 5,387,260 | 2/1995 | Gennari et al. | 198/800 X |
| 5,419,457 | 5/1995 | Ross et al. | 209/616 |
| 5,547,084 | 8/1996 | Okada et al. | 198/370.06 X |

BI-DIRECTIONAL BELT SORTER

TECHNICAL FIELD

The present invention relates generally to a bi-directional belt sorter and, more particularly, to a bi-directional belt sorter for sorting of items into a predetermined bin located along a travel path of a conveyor system.

BACKGROUND OF THE INVENTION

Conveyor systems are configured to sort items into bins located along a travel path of the conveyor system. In a typical system, the items are placed on top of a "flat" by an order filling system, and a central controller activates a divert mechanism to control the unloading of the items on a particular flat into a predetermined bin.

Presently, the flats travel along the conveyor system until a particular flat is located above or adjacent a predetermined bin. A rake is then lowered to wipe the items off the moving flat into the selected bin. Thereafter, the rake is raised to permit passage of other flats supporting items, until another item is to be unloaded from a flat into the selected bin.

Present conveyor systems have a plurality of rakes and bins located along the travel path. The bins are located directly below the flats to enable the rakes to wipe the items off the traveling flat. Present conveyor systems restrict the location of bins to along the sides of the conveyor system thereby limiting the capacity and flexibility of the conveyor system.

Also, the rakes and associated actuating equipment require a substantial amount of "headroom" over the flats such that multi-level conveyor systems are not commercially feasible. The rakes, being movable mechanical equipment, require considerable maintenance and set-up time to ensure proper functioning.

Accordingly, there is a need for a bi-directional belt sorter to eliminate the use of rakes to wipe items off a moving flat. Also there is a need to unload items into predetermined bins located on either side or below the conveyor system. These and other needs are addressed by the conveyor system of the present invention.

SUMMARY OF THE INVENTION

The present invention is a bi-directional belt sorter for unloading items into a selected bin located along a travel path of a conveyor system. The belt sorter includes a carrier and a support frame secured to the carrier, where the carrier has a plurality of orientations with respect to the support frame. The carrier includes a means for unloading items off a conveyor belt into the selected bin located to the side of or below the travel path of the conveyor system. The conveyor system includes a host computer for controlling the distribution of items to selected bins.

In accordance with the present invention there is provided a bi-directional belt sorter controlled and configured to unload items into a selected bin located to the side of or below the travel path of the conveyor system.

Also in accordance with the present invention there is provided a bi-directional belt sorter adjustable to various configurations.

BRIEF DESCRIPTION OF THE DRAWINGS

A more complete understanding of the invention may be had by reference to the following Detailed Description when taken in conjunction with the accompanying Drawings wherein.

DETAILED DESCRIPTION OF THE DRAWINGS

Figure 1:
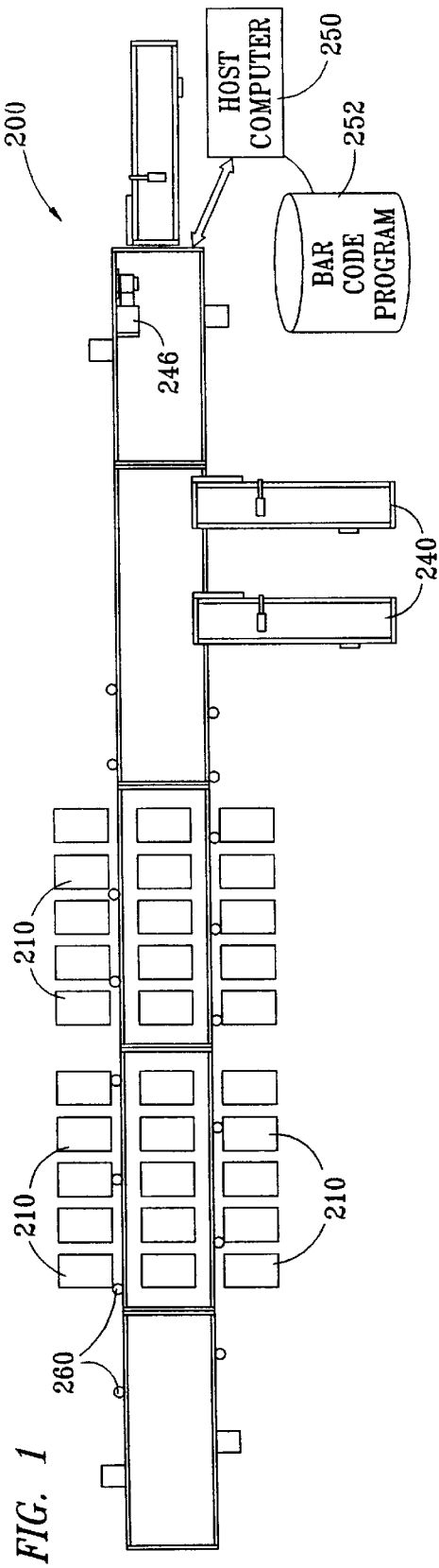
FIG. 1 is a top view of a two-tier conveyor system including sort bins located on the sides of and below the conveyor system with the belt sorters removed.

Referring to the Drawings, wherein like numerals represent like parts throughout the several views, there is generally disclosed a bi-directional belt sorter 100 in accordance with the present invention.

Although a preferred embodiment of a belt sorter 100 incorporated with a conveyor system 200 will be discussed herein, those skilled in the art will appreciate that such embodiment is only one of many utilizing the principles of the present invention. Accordingly, the belt sorter 100 described should not be construed in a limiting manner.

Figure 2:
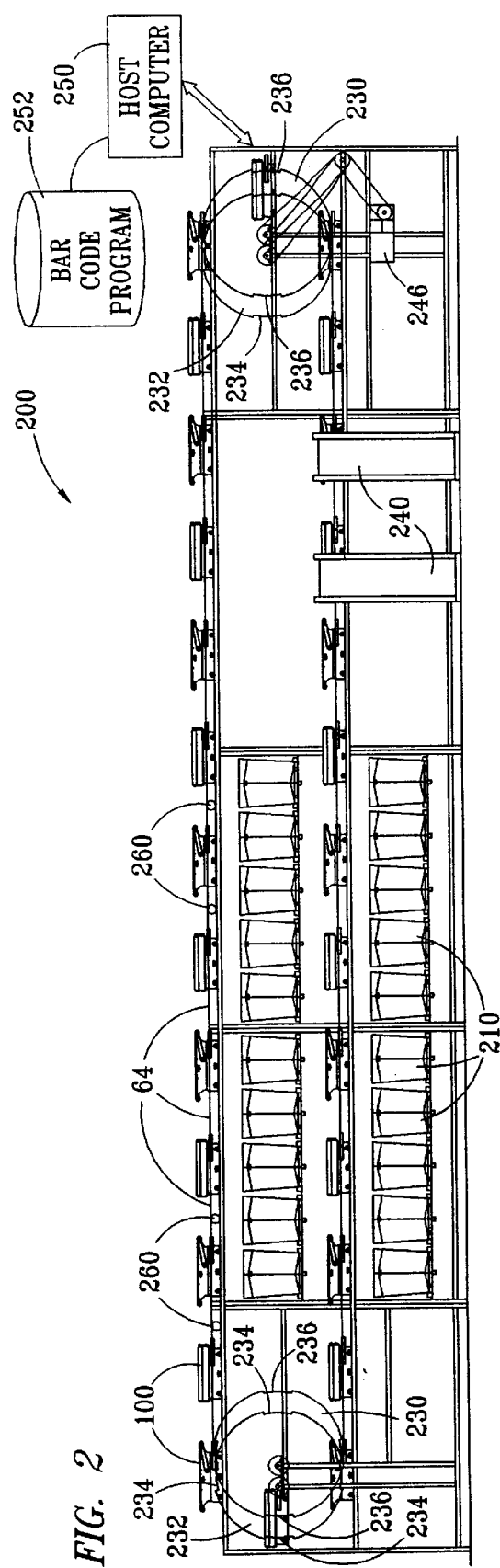
FIG. 2 is a side view of the two-tier conveyor system of FIG. 1 including sort bins, located on the side and below the bi-directional belt sorters.

An order filling system such as illustrated and described in U.S. Pat. No. 5,322,406 places items on the belt sorter 100. The items are then distributed to appropriate locations along the conveyor system 200 as illustrated in FIGS. 1 and 2. The order filling system as disclosed in U.S. Pat. No. 5,322,406 issued to Pippin et al. is hereby incorporated into the specification. A detailed description of the belt sorter 100 will be discussed after detailing the interaction of a belt sorter with the conveyor system 200.

Referring to FIG. 1, there is illustrated a top view of the two-tier conveyor system 200 including sort bins 210 located on the side of and below the conveyor system 200. Items to be distributed are transported to the travel path of the conveyor system 200 by at least one loading ramp 240. The loading ramp 240 may be connected to the order filling system (not shown.) The travel path of the system will be discussed in further detail later in the description.

The belt sorters 100 are controlled by a host computer 250 to unload items carried by each of a plurality of belt-sorters into a selected bin 210 located to the side of and below the travel path of the conveyor system 200.

Referring to FIG. 2, there is illustrated the conveyor system 200 having a plurality of the belt sorters 100. The conveyor system 200 includes a transition mechanism for vertically transporting the belt sorter 100 from a first level to a second level and then return to the first level.

The transition mechanism includes a first pair of sprocket wheels 230 (only one shown at both ends of the conveyor) and a second pair of sprocket wheels 232 (only one shown at each end of the conveyor) offset from the sprocket wheel 230 and rotated by a conventional motorized drive 246. The first pair of sprocket wheels 230 and the second pair of sprocket wheels 232 each have spaced pockets 234 and 236 to enable a first belt connector 72 and a second belt connector 74 of a support frame 70 (see FIG. 5) rotate with the rotation of the sprocket wheel. The support frame 70 follows the travel path of the conveyor system 200.

Figure 6:
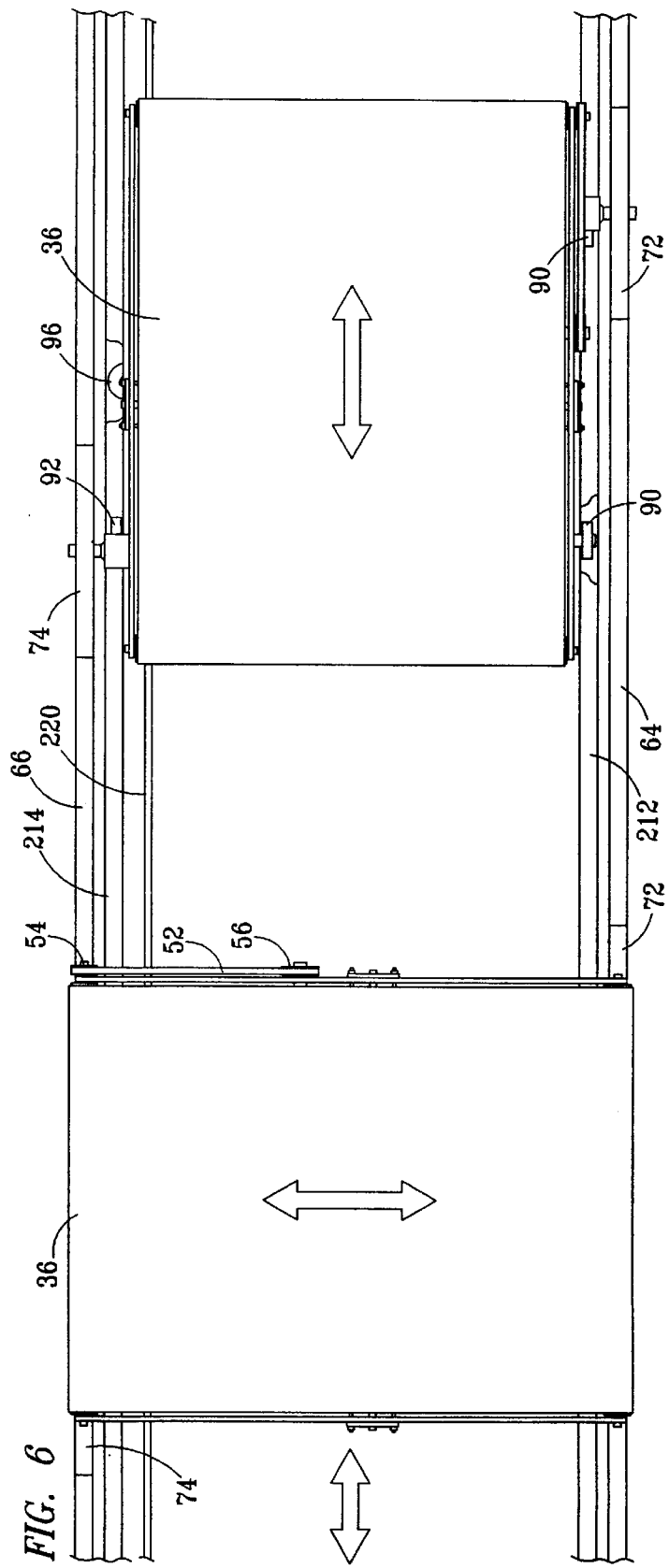
FIG. 6 is a top view of the two bi-directional belt sorters of FIG. 5.

Referring to FIG. 6, the first belt connector 72 and the second belt connector 74 are offset from one another in relation to connections to the support frame 70 such that the belt sorter 100 remains substantially horizontal during transition between the two levels of the conveyor system 200.

Referring again to FIG. 2, the host computer 250 is preferably a programmable logic controller that communicates with each of the plurality of belt sorters 100 to unload items from the belt sorters into one of the plurality of selectable bins 210. The host computer 250 preferably utilizes a bar code based program 252 to control the entire operation of the conveyor system 200 including the individual belt sorters 100. Also, provided along the travel path are sensors 260 in communication with the host computer 250 to indicate the location of each of the belt sorters 100 in relation to the bins 210. The sensors 260 may be optoelectronic or proximity type devices which are well known in the art.

Figure 3:
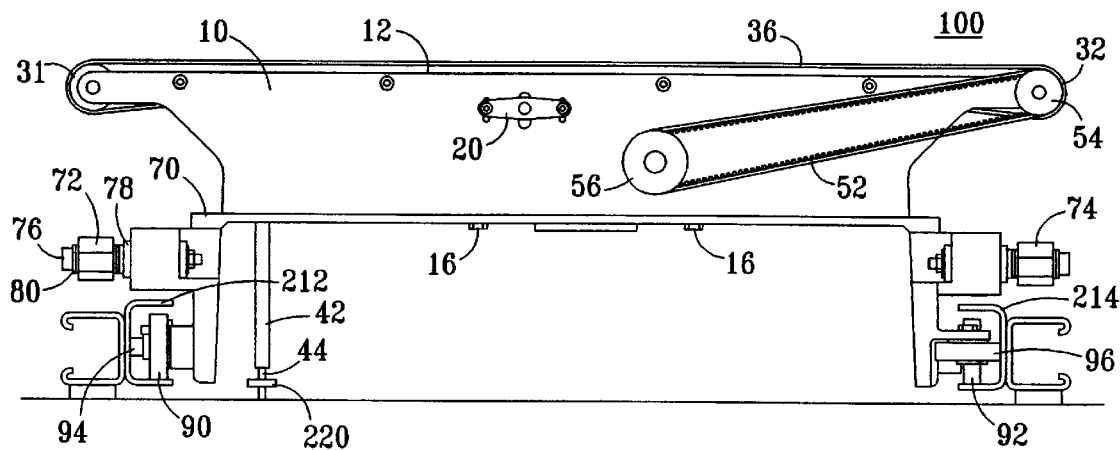
FIG. 3 is an end view of the conveyor system of the present invention illustrating a bi-directional belt sorter oriented for sorting items into bins located to the side of the conveyor system.
Figure 4:
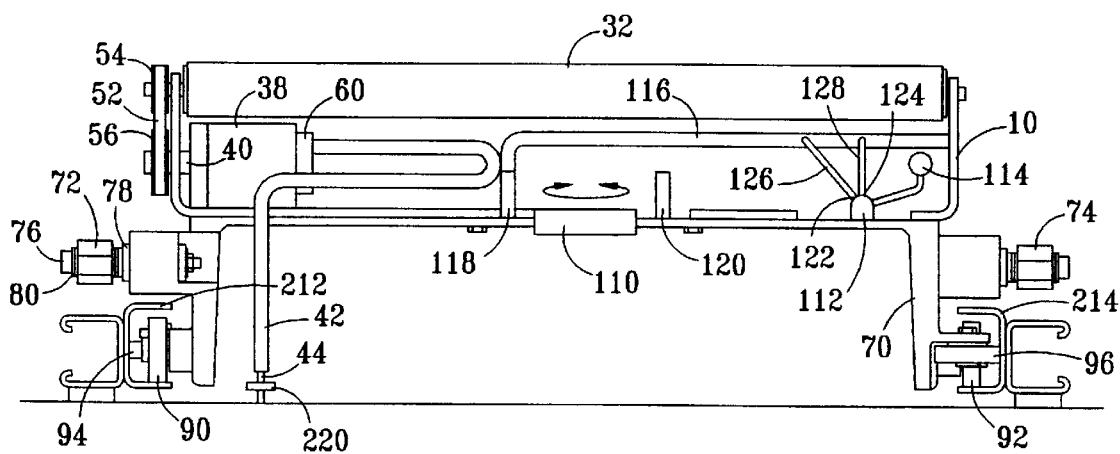
FIG. 4 is an end view of the bi-directional belt sorter oriented for sorting of items into bins located below the conveyor system.

Referring to FIGS. 3 and 4, there is illustrated an end view of the belt-sorter 100 for sorting items into bins 210 located below or to a side of the conveyor system. The carrier 10 is secured to the support frame 70 by conventional fastening devices. The carrier 10 may have multiple orientations with respect to the support frame 70; however, a side orientation (refer to FIG. 3) and a front orientation (refer to FIG. 4) are preferable configurations.

Referring to FIG. 4, as an alternate to a fixed connection between the carrier 10 and the support frame 70 a mechanical coupling may be used to change the orientation of the carrier 10 with respect to the support frame 70. The mechanical coupling includes a bearing 110 that rotatably connects the carrier 10 to the support frame 70. Secured to the support frame 70 are a front orientation stop 118 and a side orientation stop 120 positioned to engage a carrier stop 116. When the carrier stop 116 and the front orientation stop 118 are engaged the belt sorter 100 has a front orientation as illustrated in FIG. 4. When the carrier stop 116 engages the side orientation stop 120 the belt sorter 100 has a side orientation as illustrated in FIG. 3.

The carrier 10 is preferably rotated between the two possible orientations by controlling a solenoid 112 coupled to the host computer 250. The solenoid 112 is secured to the support frame 70. A front linkage arm 126 is connected to a first output 122 of the solenoid 112 and the carrier stop 116. Actuation of the first output 122 causes the carrier 10 to be rotated and maintained in a front orientation.

Also, a side linkage arm 128 is connected to a second output 124 of the solenoid 112 and the carrier stop 116. Actuation of the second output 124 causes the carrier to be rotated and maintained in a side orientation. The components of the mechanical coupling are individually commercially available.

The carrier 10 includes an unloading system to distribute items to preselected bin locations. The unloading system includes a pair of rollers 32 and 31 rotatably supported at opposite ends on a top 12 of the carrier 10. Engaging the rollers 32 and 31 is a conveyor belt 36 that is actuated by movement of the rollers 32 and 34.

The unloading system further includes a drive motor 38 (refer to FIG. 4) having an output shaft 40 connected to a drive system. In the preferred embodiment, the drive system includes a drive belt 52 that connects a pair of drive pulleys 54 and 56. The first drive pulley 54 connects the roller 32 and the second drive pulley 56 connects to the output shaft 40 of the drive motor 38.

Power for the drive motor 38 is provided by an electrified track 220 positioned along the travel path of the conveyor system 200. A conduit 42 connected to the drive motor 38 and terminating at the electrified track 220 encloses conductors 44 in contact with the electrified track.

Alternatively, the drive motor 38 may be adapted to operate using a battery or other power source located remotely or locally near the drive motor.

To unload an item from the carrier 10 the drive motor 38 is actuated by a controller 60. The controller 60 receives an on-off control signal from the electrified track 22 to energize or de-energize the dive motor 38 depending on the location of the belt sorter 100 in relation to the predetermined bin 210. In addition to an on-off control signal, the controller 60 also receives a forward-reverse control signal to control an operating direction of the drive motor 38 to unload items from the conveyor belt 36 in either a forward or reverse direction.

Referring to FIGS. 3–6, rotatably connected to opposite sides of the support frame 70 are the first belt connector 72 and the second belt connector 74. Each of the belt connectors 72 and 74 are secured to a pin 76 rotatably mounted in the support frame 70 by means of a ball bearing 78. A fastener 80 secures each of the belt connectors 74 and 72 to a respective pin 76.

Also rotatably supported to the support frame 70 are pairs of vertical rollers 90 and 92. The pair of vertical rollers 90 engages a first rail 212 and the pair of vertical rollers 92 engages a second rail 214. The first rail 212 and the second rail 214 are part of the conveyor system 200 as illustrated in FIGS. 1 and 2 and establish the travel path of the belt sorters 100.

In addition, rotatably attached to the support frame 70 are horizontal rollers 94 and 96. As most clearly illustrated in FIGS. 5 and 6, the horizontal rollers 94 and 96 are attached to the support frame between the pair of vertical rollers 90 and 92. The horizontal roller 94 engages the vertical web section of the first rail 212 and the horizontal roller 96 engages the vertical web section of the second rail 214. The horizontal rollers 94 and 96 along with the pairs of vertical rollers 90 and 92 establish the travel path of the belt sorter 100 in the conveyor system 200.

Also illustrated as part of the belt sorter 100 and specifically the carrier 10 is a tension adjuster 20 setting the tension of the conveyor belt 36. Typically, the adjuster 20 is an idler roller (not shown) that is vertically adjustable to set the tension on the conveyor belt 36.

Figure 5:
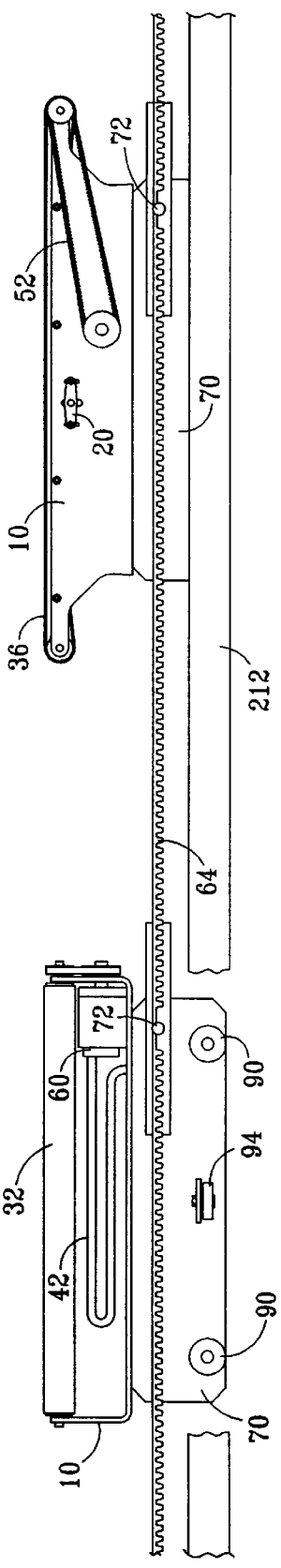
FIG. 5 is a side view of two bi-directional belt sorters interconnected by pre-cut belts with the sorters shown in the two available orientations.

Referring to FIGS. 5 and 6, two belt sorters 100 are shown (one oriented in line with the travel path and the second oriented transverse to the travel path) interconnected by a first pre-cut belt 64 and a second pre-cut belt 66. The first pre-cut belt 64 connects a pair of the first belt connectors 72, and the second pre-cut belt 66 connects a pair of the second belt connectors 74. As shown, the typical pre-cut belts 64 and 66 are conventional flexible timing belts or any other commercially available drive belt.

A plurality of support frames 70 may be interconnected by using the pre-cut belts 64 and 66. Additionally, the first pre-cut belt 64 and second pre-cut belt 66 have selected lengths to determine the spacing between the belt sorters 100.

The orientation of the carrier 10 for each belt sorter 100 may dictate the desired spacing between adjacent belt sorters. For example, a pair of carriers 10 having side orientations may be located closer to one another than if the carriers 10 had in line orientations. The orientation of the carrier 10 indicates whether an item will be unloaded on a particular side or directly below the conveyor system 200.

While the present invention has been described with reference to the illustrated embodiment, it is not intended to limit the invention but, on the contrary, it is intended to cover such alternatives, modifications and equivalents as may be included in the spirit and scope of the invention as defined in the following claims.

We claim:

1. A bi-directional belt sorter for unloading items into a selected bin located along a travel path of a conveyor system comprising:

a support frame coupled to the conveyor system to move along the travel path; and a carrier connected to the support frame in one of a plurality of available orientations, said carrier including unloading means for delivering items into a selected bin located to a side of or in line with the travel path of the conveyor system.

2. The bi-directional belt sorter in accordance with claim 1 wherein the carrier further includes a frame and the unloading means comprises:

first and second rollers rotatably connected to the frame of said carrier;

a conveyor belt supported by the first and second rollers;

a motor coupled to the first of said rollers; and a controller for energizing said motor to actuate the first and second rollers and said conveyor belt.

3. The bi-directional belt sorter in accordance with claim 2 wherein the unloading means further include means for connecting power to said motor and control signals to said controller.

4. The bi-directional belt sorter in accordance with claim 3 wherein the controller includes sensors positioned along the travel path for generating control signals to energize or de-energize the motor depending on a location of said carrier in relation to a selected bin.

5. The bi-directional belt sorter in accordance with claim 4 wherein the controller responds to a forward-reverse control signal to control the operating direction of the motor to unloaded items from the conveyor belt into a selected bin.

6. The bi-directional belt sorter in accordance with claim 5 wherein the controller further includes a host computer for generating an on-off control signal and the forward-reverse control signal.

7. The bi-directional belt sorter in accordance with claim 1 wherein the support frame further includes at least one vertical roller secured to opposite sides of the support frame, said vertical rollers are disposed in the travel path of the conveyor system.

8. The bi-directional belt sorter in accordance with claim 7 wherein the support frame further includes a first horizontal roller and a second horizontal roller secured to each side of the support frame having the vertical rollers, said first and second horizontal rollers are disposed in the travel path of the conveyor system.

9. A bi-directional conveyor system comprising:

a plurality of belt sorters, each including:

a support frame coupled to the conveyor system to move along a travel path;

a carrier connected to the support frame in one of a plurality of available orientations, said carrier including unloading means for delivering items into a selected bin located to a side of or in line with the travel path of the conveyor system; and a transition mechanism for vertically transporting the belt sorters to at least one different level of the conveyor system, wherein the belt sorter remains substantially horizontal during transition to the at least one different level of the conveyor system.

10. The bi-directional conveyor system in accordance with claim 9 including a plurality of pre-cut belts interconnecting the belt sorters, the belts having selected lengths to determine spacing between the belt sorters.

11. The bi-directional conveyor system in accordance with claim 9 wherein the transition mechanism includes a first sprocket wheel and a second sprocket wheel each having at least one pocket sized and configured to engage a first connector and a second connector, respectively.

12. A bi-directional belt sorter for unloading items into a selected bin located along a travel path of a conveyor system comprising:

a support frame coupled to the conveyor system to move along the travel path;

a carrier rotatably connected to the support frame in one of a plurality of orientations with respect to the support frame, said carrier including unloading means for delivering items into a selected bin located to a side of or in-line with the travel path of the conveyor system; and means rotatably connecting said carrier to said support frame for mechanically rotating the carrier to one of the plurality of orientations.

13. The bi-directional belt sorter in accordance with claim 12 wherein the carrier further includes a frame and the unloading means comprises:

first and second rollers rotatably connected to the frame of said carrier;

a conveyor belt supported by the first and second rollers;

a motor coupled to the first of said rollers; and a controller for energizing said motor to actuate the first and second rollers and said conveyor belt.

14. The bi-directional belt sorter in accordance with claim 13 wherein the unloading means further include means for connecting power to said motor and control signals to said controller.

15. The bi-directional belt sorter in accordance with claim 14 wherein the controller includes sensors positioned along the travel path for generating control signals to energize or de-energize the motor depending on a location of said carrier in relation to a selected bin.

16. The bi-directional belt sorter in accordance with claim 15 wherein the controller responds to a forward-reverse control signal to control the operating direction of the motor to unloaded items from the conveyor belt into a selected bin.

17. The bi-directional belt sorter in accordance with claim 16 wherein the controller further includes a host computer for generating an on-off control signal and the forward-reverse control signal.

18. The bi-directional belt sorter in accordance with claim 12 wherein the support frame further includes at least one vertical roller secured to opposite sides of the support frame, said vertical rollers are disposed in the travel path of the conveyor system.

19. The bi-directional belt sorter in accordance with claim 18 wherein the support frame further includes a first horizontal roller and a second horizontal roller secured to each side of the support frame having the vertical rollers, said first and second horizontal rollers are disposed in the travel path of the conveyor system.

20. A bi-directional conveyor system comprising: a plurality of belt sorters, each including:

a support frame coupled to the conveyor system to move along the travel path;

a carrier rotatably connected to the support frame in one of a plurality of orientations with respect to the support frame, said carrier including unloading means for delivering items into a selected bin located to a side of or in-line with the travel path of the conveyor system; and means rotatably connecting said carrier to said support frame for mechanically rotating the carrier to one of the plurality of orientations; and a transition mechanism for vertically transporting the belt sorters to at least one different level of the conveyor system, wherein the belt sorter remains substantially horizontal during transition to the at least one different level of the conveyor system.

21. The bi-directional conveyor system in accordance with claim 20 including a plurality of pre-cut belts interconnecting the belt sorters, the belts having selected lengths to determine the spacing between the belt sorters.

22. The bi-directional conveyor system in accordance with claim 20 wherein the transition mechanism includes a first sprocket wheel and a second sprocket wheel each having at least one pocket sized and configured to engage a first connector and a second connector, respectively.

23. A bi-directional belt sorter for distribution of items comprising:

a support frame coupled to the conveyor system to move along the travel path;

a carrier rotatably connected to the support frame in one of a plurality of orientations with respect to the support frame, said carrier including unloading means for delivering items into a selected bin located to a side of or in-line with the travel path of the conveyor system; and means rotatably connecting said carrier to said support frame for mechanically rotating the carrier to one of the plurality of orientations.

* * * * *